US011618427B2

(12) United States Patent
Horii et al.

(10) Patent No.: US 11,618,427 B2
(45) Date of Patent: Apr. 4, 2023

(54) VEHICLE CONTROL DEVICE

(71) Applicant: HONDA MOTOR CO., LTD., Tokyo (JP)

(72) Inventors: Eisuke Horii, Wako (JP); Katsuhito Kanbe, Wako (JP); Hiroyuki Hase, Wako (JP); Hideharu Murano, Wako (JP); Shinji Suto, Wako (JP); Keishiro Kikuchi, Wako (JP); Katsuya Matsuzaki, Wako (JP); Toru Watanabe, Tokyo (JP); Hisanori Yanagida, Wako (JP); Yuki Hotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 491 days.

(21) Appl. No.: 16/641,431

(22) PCT Filed: Aug. 31, 2017

(86) PCT No.: PCT/JP2017/031322

§ 371 (c)(1),
(2) Date: Feb. 24, 2020

(87) PCT Pub. No.: WO2019/043862

PCT Pub. Date: Mar. 7, 2019

(65) Prior Publication Data

US 2021/0139011 A1    May 13, 2021

(51) Int. Cl.
*B60T 17/22* (2006.01)
*B60T 8/88* (2006.01)

(52) U.S. Cl.
CPC ............ *B60T 17/221* (2013.01); *B60T 8/885* (2013.01); *B60T 2270/406* (2013.01)

(58) Field of Classification Search
None
See application file for complete search history.

(56) References Cited

U.S. PATENT DOCUMENTS 6,382,737 B1    5/2002  Isono et al.
2006/0229777 A1* 10/2006  Hudson ............... G05B 23/021
                                                                    701/31.4

(Continued)

FOREIGN PATENT DOCUMENTS

DE         10044223 A1    4/2001
DE    102006021604 A1   11/2006

(Continued)

OTHER PUBLICATIONS

Machine translation of JP 2001253307 A : Kesch B, Sep. 2010 (Year: 2010).*

(Continued)

*Primary Examiner* — James J Lee
*Assistant Examiner* — David Hatch
(74) *Attorney, Agent, or Firm* — Rankin, Hill & Clark LLP

(57) ABSTRACT

A vehicle control device that controls a vehicle electric brake system includes: a shutdown determination part that determines whether the vehicle control device itself has been previously shut down normally or abnormally; a cranking determination part that determines whether an instruction to perform a cranking at a start-up of the vehicle is based on a manual operation of a driver of the vehicle or automatically; a diagnosis part that performs a plurality of initial diagnoses of the vehicle control device at the start-up of the vehicle; and a diagnosis skip control part configured to provide control such that the diagnosis part skips at least one of the initial diagnoses when the shutdown determination part determines that the vehicle control device has been previously shut down abnormally, and at the same time, when the (Continued)

cranking determination part determines that the cranking has been conducted based on the driver's manual operation.

18 Claims, 7 Drawing Sheets

(56) References Cited

U.S. PATENT DOCUMENTS

| | | | |
|---|---|---|---|
| 2006/0258508 A1* | 11/2006 | Tanioka | B60R 25/04 477/203 |
| 2013/0127240 A1 | 5/2013 | Noro et al. | |
| 2017/0305368 A1* | 10/2017 | Markham | B60R 16/0231 |

FOREIGN PATENT DOCUMENTS

| | | | |
|---|---|---|---|
| DE | 102012221395 A1 | 5/2013 | |
| EP | 2055935 A1 | 5/2009 | |
| JP | 2001253307 A * | 9/2001 | |
| JP | 2007-046546 A | 2/2007 | |
| JP | 2008-286032 A | 11/2008 | |
| JP | 2009-108727 A | 5/2009 | |
| JP | 2014-144712 A | 8/2014 | |
| WO | WO-2010108729 A1 * | 9/2010 | B60L 11/14 |

OTHER PUBLICATIONS

Machine translation of WO 2010108729 A1 : Aizawa H, Sep. 2001 (Year: 2001).*

Office Action received in corresponding DE application No. 112017007981.0 dated Jun. 29, 2022 with English translation (12 pages).

International Search Report by ISA/JP dated Dec. 5, 2017, on PCT/JP2017/031322.

Written Opinion by ISA/JP dated Dec. 5, 2017, on PCT/JP2017/031322, 3 pages.

* cited by examiner

VEHICLE CONTROL DEVICE

CROSS REFERENCE TO RELATED APPLICATION

This application is a National Stage Application of PCT/JP2017/031322, filed on Aug. 31, 2017, and which application is incorporated herein by reference. To the extent appropriate, a claim of priority is made to the above disclosed application.

TECHNICAL FIELD

The present invention relates to a vehicle control device.

BACKGROUND ART

Japanese Laid-Open Patent Application, Publication No. 2008-286032 (to be referred to as Patent Document 1 hereinafter) discloses a technique of no idling. Under no idling control, an engine of a vehicle is automatically stopped. Then, when a driver of the vehicle takes his/her foot off a brake pedal and presses an accelerator pedal, the vehicle is automatically restarted. When an ECU is reset in such a case of a restart, an initial check on the ABSECU or the like has been conducted conventionally. In the technique of Patent Document 1, however, control is provided such that the initial check is skipped at a time of the restart.

A no idling operation is conducted some hundreds of thousands of times in one vehicle. If an initial check is performed each time an engine is restarted from no idling, unnecessary writes are made in a memory of the ABSECU, even though there is a predetermined upper limit of the number of writes in the memory. Every time the initial check is executed, a lamp is lit as warning, which results in poor marketability. Every time the initial check is executed, operation checks of various actuators are also performed. This means that each time the vehicle is restarted from a no idling state, the initial check is executed. This negatively affects durability of the actuators. For those reasons, Patent Document 1 skips the initial check described above.

RELATED ART DOCUMENT

Patent Document

Japanese Laid-Open Patent Application, Publication No. 2008-286032

SUMMARY OF THE INVENTION

Problems to be Solved by the Invention

When to need to skip a processing equivalent or similar to the above-described initial check is not, however, limited to only when a vehicle is restarted from a no idling state.

Assume a case in which, when a driver manually starts up a vehicle by turning an ignition switch ON or the like, a battery has already become degraded or the vehicle is located in a cold area. In either case, when cranking is performed at the start-up of the vehicle, output voltage of the on-board battery is instantaneously decreased due to power consumption of a starter. Then, in some cases, the output voltage falls even below a threshold voltage at or under which a brake ECU (Electronic Control Unit) for controlling an electric brake system is reset. If the brake ECU is reset, it takes several hundred milliseconds to several seconds to conduct an initial diagnosis for a restart (such as checking of a current-carrying state). The electric brake system cannot thus fulfill normal functions thereof during the time period. This potentially causes a slide down of the vehicle if the vehicle is on a slope or the like and gives the driver a feeling of something uncomfortable.

In light of the described above, the present invention has been made in an attempt to ensure a necessary prompt braking force, even when the brake ECU has been reset at a time of a vehicle start-up operation by a driver's manual operation.

Means for Solving the Problem

A vehicle control device which provides control on an electric brake system of a vehicle includes: a shutdown determination part configured to determine whether the vehicle control device itself has been previously shut down normally or abnormally; a cranking determination part configured to determine whether or not an instruction to perform a cranking at a start-up of the vehicle is based on a manual operation of a driver of the vehicle; a diagnosis part configured to perform a plurality of initial diagnoses of the vehicle control device at the start-up of the vehicle; and a diagnosis skip control part configured to provide control such that the diagnosis part skips at least one of the initial diagnoses so as to reduce a time required for the initial diagnoses or skips all of the initial diagnoses, when the shutdown determination part determines that the vehicle control device has been previously shut down abnormally, and at the same time, when the cranking determination part determines that the cranking has been conducted based on the driver's manual operation.

Advantageous Effects of the Invention

In the present invention, a necessary prompt braking force is ensured, even when the brake ECU has been reset at a time of a vehicle start-up operation by a driver's manual operation.

EMBODIMENTS FOR CARRYING OUT THE INVENTION

An embodiment of the present invention is described next with reference to related drawings.

Figure 1:
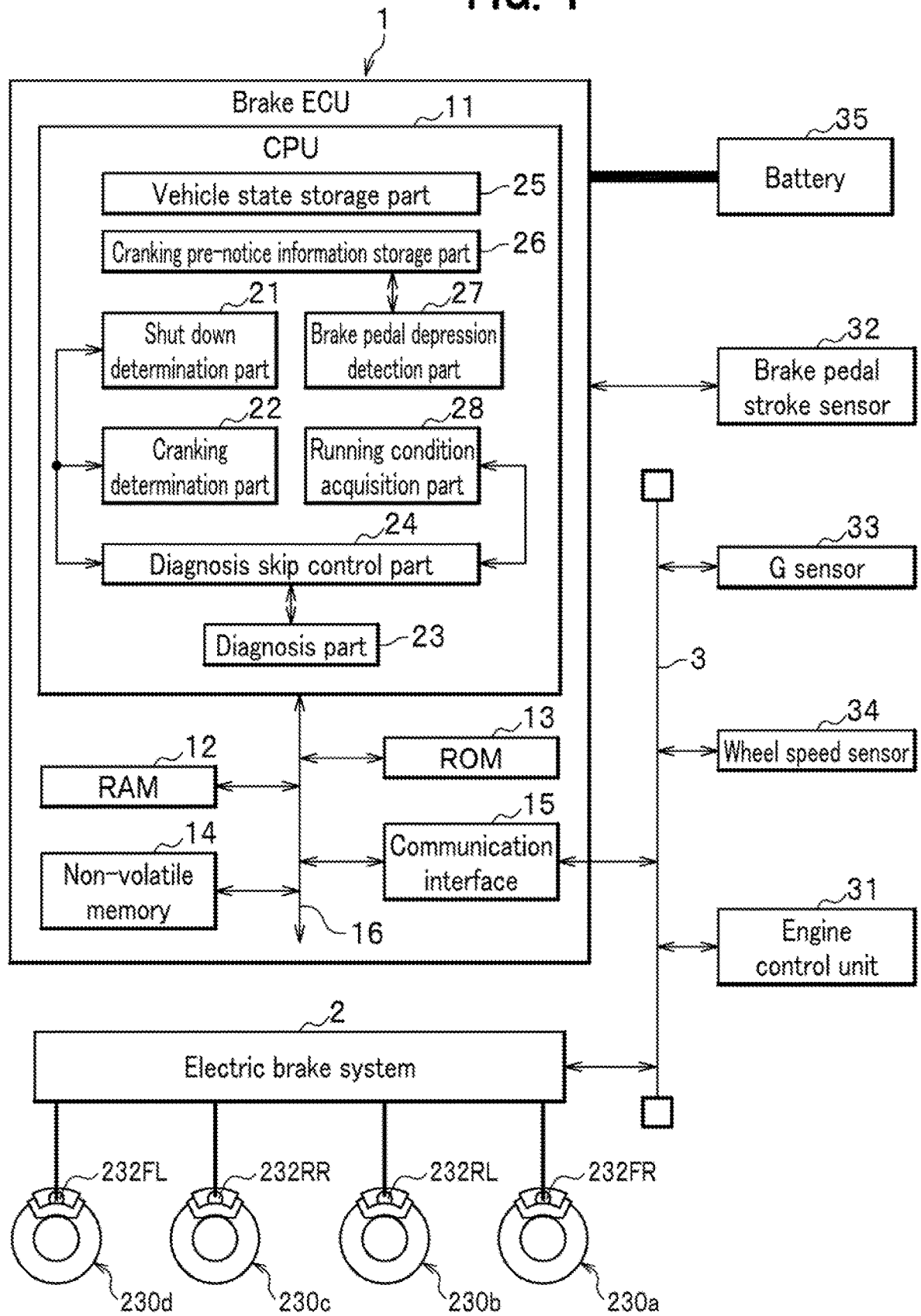
FIG. 1 is a functional block diagram illustrating a structure of a braking system of a vehicle according to an embodiment of the present invention.

FIG. 1 is a functional block diagram illustrating a structure of a braking system of a vehicle according to an embodiment of the present invention. An electric brake system 2 generates fluid pressure in wheel cylinders 232FR, 232RL, 232RR, 232FL of respective disk brake mechanisms 230a to 230d provided on respective wheels of a four-wheel vehicle. This drives the disk brake mechanisms 230a to 230d and thus generates friction braking force on the respective wheels. A CAN (Controller Area Network) communication system 3 performs communication between components in the vehicle.

The CAN communication system 3 is connected to each of: the electric brake system 2; and a brake ECU 1 that is a vehicle controller for controlling the electric brake system 2 and embodies a vehicle control device of the present invention. With the structure, the electric brake system 2 and the brake ECU 1 perform communication therebetween, and the brake ECU 1 thereby provides control on the electric brake system 2.

The brake ECU 1 is mainly constituted by a microcomputer. The brake ECU 1 includes a CPU (Central Processing Unit) 11 that performs computing of various types and controls components thereof in a centralized manner. The brake ECU 1 also includes a RAM (Random Access Memory) 12 which serves as an operation area of the CPU 11. The brake ECU 1 includes a ROM (Read Only Memory) 13 that stores therein various control programs executed by the CPU 11, fixed data, or the like. The brake ECU 1 includes a non-volatile memory 14. The brake ECU 1 includes a communication interface (I/F) 15 that performs communication with the CAN communication system 3. The electronic components including the CPU 11 and the others described above are connected to each other via a bus 16.

Various ECUs such as an engine control unit 31 are connected to the CAN communication system 3. The engine control unit 31 is an ECU that provides control on an engine (not illustrated) of the vehicle. Various sensors such as a G sensor 33 and a wheel speed sensor 34 are connected to the CAN communication system 3. The G sensor 33 detects a condition change in attitude of the vehicle, or the like. The wheel speed sensor 34 detects a speed of a wheel of the vehicle. The brake ECU 1 is also connected to a brake pedal stroke sensor 32 that detects a stroke of depressing a brake pedal (not illustrated). More specifically, the brake pedal stroke sensor 32 is connected to the bus 16 via a predetermined interface not illustrated. A battery 35 is a power supply source that supplies power to an electric system of the vehicle. The brake ECU 1 is also driven by power supply from the battery 35.

In FIG. 1, the CPU 11 is illustrated with functions characteristic of the present embodiment which operate by respective control programs stored in the ROM 13, as functional blocks. Next are described those functional blocks.

A shutdown determination part 21 determines whether the brake ECU 1 which controls the electric brake system 2 of the vehicle has been previously shut down normally or abnormally.

A cranking determination part 22 determines whether an instruction of cranking at a start-up of the vehicle is performed based on a manual operation of a driver or automatically.

A diagnosis part 23 normally conducts a plurality of initial diagnoses at the start-up of the vehicle.

A diagnosis skip control part 24 determines the following conditions: (1) whether or not the shutdown determination part 21 has determined that the brake ECU 1 was shut down abnormally; and (2) whether or not the cranking determination part 22 has determined that cranking to be performed at this time was performed based on a manual operation of a driver instructing an engine start-up. If it is determined that: (1) the brake ECU 1 was shut down abnormally; and (2) the cranking was performed based on the manual operation of the driver, the diagnosis skip control part 24 provides control such that: the diagnosis part 23 skips at least one of the above-described initial diagnoses so as to reduce time required for the diagnoses; or no initial diagnosis is conducted.

A vehicle state storage part 25 stores, when the brake ECU 1 was previously shut down normally, vehicle state information showing a state of a vehicle of interest at a time of the shut-down, in a predetermined storage area in the non-volatile memory 14. The vehicle state information includes information on various settings concerning the vehicle at the time of the shut-down. The diagnosis skip control part 24 of the vehicle determines that the previous shutdown was abnormal, if the vehicle state information has not been stored in the predetermined storage area in the non-volatile memory 14 at the start-up of the vehicle. The diagnosis skip control part 24 determines, in the meantime, that the previous shutdown was normal, if the vehicle state information has been stored in the non-volatile memory 14.

A cranking pre-notice information storage part 26 stores cranking pre-notice information in the non-volatile memory 14 (or the RAM 12), when the driver of the vehicle gives an instruction to start up the engine via the manual operation. The cranking pre-notice information is information showing that cranking of the engine to be performed is based on the driver's manual operation for instructing to start up the engine. If the cranking pre-notice information has been stored in the non-volatile memory 14 at start-up of the vehicle, the diagnosis skip control part 24 determines that cranking of the engine is about to be performed based on the driver's manual operation. If the cranking pre-notice information has not been stored in the non-volatile memory 14 or the like at the start-up of the vehicle, the diagnosis skip control part 24 determines that cranking of the engine is about to be performed automatically, that is, not based on the driver's manual operation in such a case when the engine is restarted under no idling control.

A brake pedal depression detection part 27 detects a depression of the brake pedal (not illustrated) of the vehicle, based on a detection signal from the brake pedal stroke sensor 32. The cranking pre-notice information storage part 26 stores therein the cranking pre-notice information, only when the driver has performed a manual operation for instructing to conduct a cranking while the brake pedal depression detection part 27 is detecting the depression of the brake pedal.

A running condition acquisition part 28 acquires information on a running condition of the vehicle. Specific examples of the running condition of the vehicle will be described hereinafter. The diagnosis skip control part 24 determines whether or not any of a plurality of the initial diagnoses is to be omitted, depending on the vehicle running condition information acquired by the running condition acquisition part 28.

Next is described a sequence of processings characteristic of the present invention which are realized by the functional blocks of the CPU 11, with reference to related flowcharts. FIG. 2 to FIG. 5 are each a flowchart for explaining the sequence of the processings realized by the functional blocks of the CPU 11.

Figure 2:
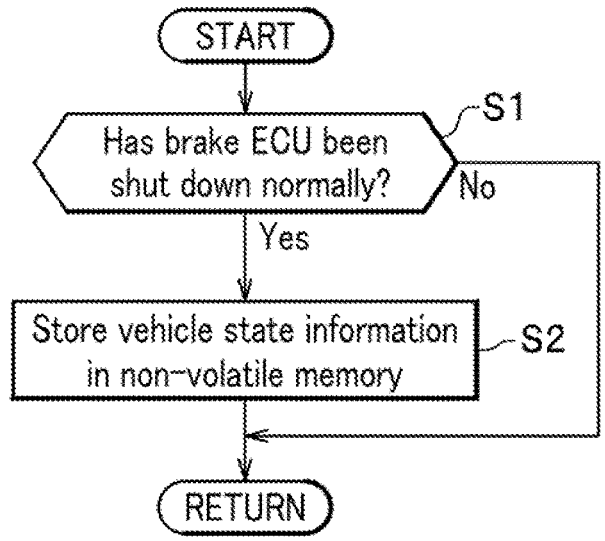
FIG. 2 is a flowchart for explaining a processing performed by a brake ECU according to the embodiment.

As shown in FIG. 2, if the brake ECU 1 is determined to have been previously shut down normally (if Yes in S1), the vehicle state storage part 25 performs the following steps. The vehicle state storage part 25 stores the vehicle state information showing the state of the vehicle at the time of the shutdown, in a predetermined storage area in the non-volatile memory 14 (S2). If the brake ECU 1 is determined to have been previously shut down abnormally (if No in S1), the vehicle state storage part 25 skips storage of the vehicle state information, and the processing returns to S1.

Figure 3:
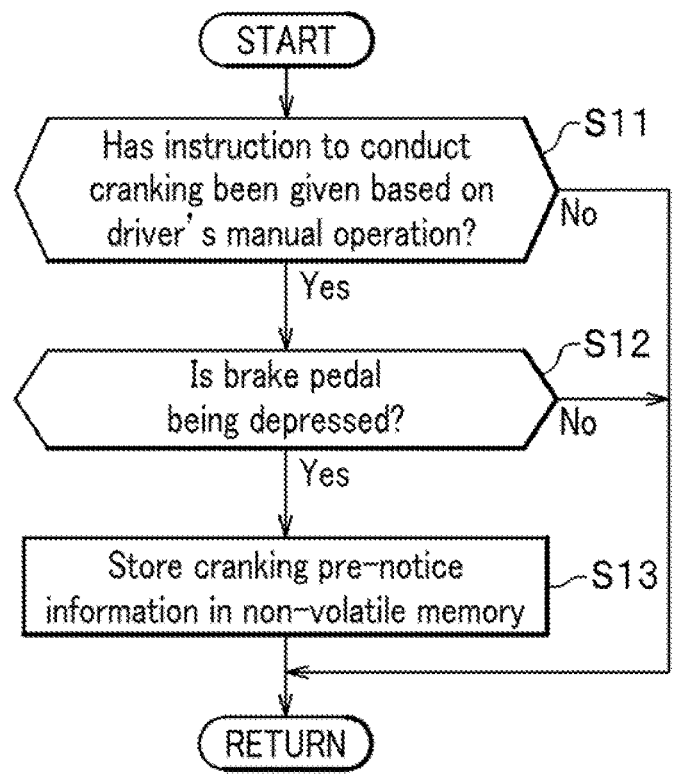
FIG. 3 is a flowchart for explaining another processing performed by the brake ECU according to the embodiment.

As illustrated in FIG. 3, the cranking pre-notice information storage part 26 determines whether or not an instruction to conduct a cranking has been given via a driver's manual operation (S11). The driver's manual operation used herein means a manual operation by a driver for instructing to conduct a cranking, and therefore to start up an engine. More specifically, the driver's manual operation means an operation of turning ON an ignition switch, including an operation of manipulating an engine start button for instructing to start up an engine. Note that the driver's manual operation does not include a case in which a cranking is automatically instructed, such as an engine restart after no idling control.

If an instruction to conduct a cranking is determined to have been given based on the driver's manual operation (if Yes in S11), the brake pedal depression detection part 27 determines whether or not the brake pedal is being depressed, based on a detection signal from the brake pedal stroke sensor 32 (S12). If the brake pedal is being depressed, the cranking pre-notice information storage part 26 stores the cranking pre-notice information in the non-volatile memory 14 or the like (S13). The storage of the cranking pre-notice information is performed after the cranking is conducted. If an instruction to conduct a cranking is not determined to have been given based on the driver's manual operation (if No in S11) or if the brake pedal is not determined to be depressed (if No in S12), the cranking pre-notice information storage part 26 skips storage of the cranking pre-notice information, and the processing returns to step S11.

Figure 4:
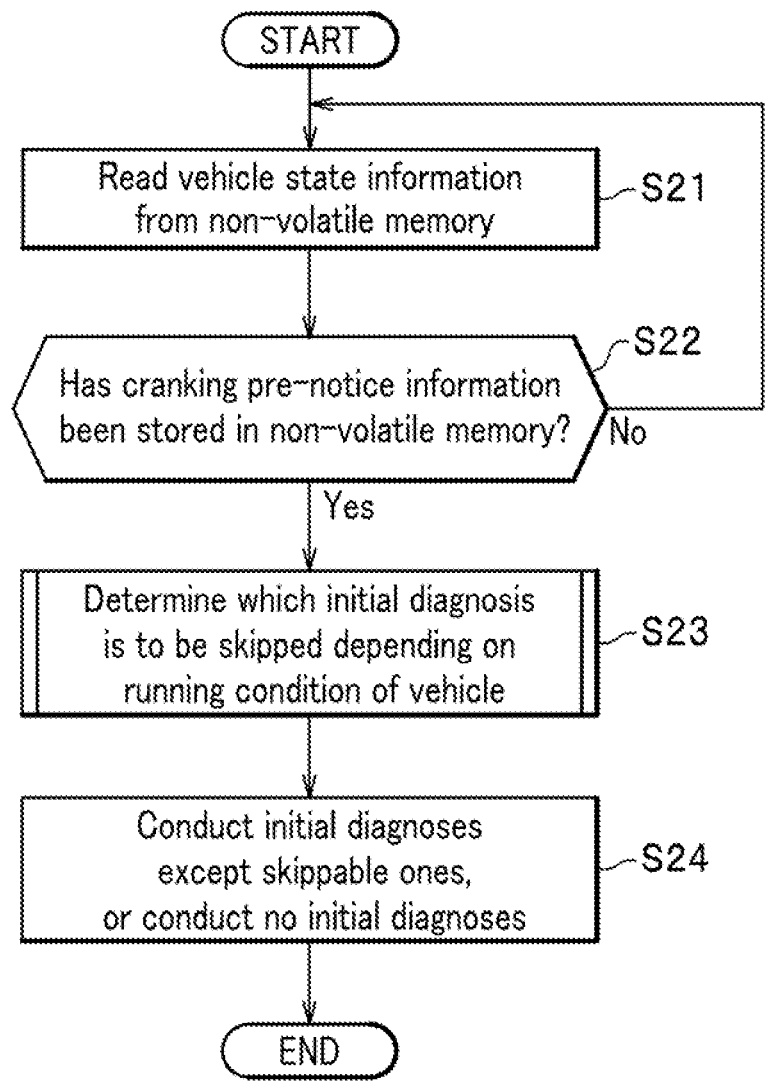
FIG. 4 is a flowchart for explaining a still another processing performed by the brake ECU according to the embodiment.

A processing illustrated in FIG. 4 is described next. The processing of FIG. 4 starts when predetermined power supply to the brake ECU 1 begins, to thereby start up the brake ECU 1. In other words, the processing starts, when the brake ECU 1 is intended to be started (restarted) up after the brake ECU 1 has been shut down normally or abnormally. That is, the processing starts when the engine is started up including such a case when an engine start button is manually operated, an ignition is turned ON, the engine is restarted under no idling control, or the like. In the processing of FIG. 4, the shutdown determination part 21 reads the vehicle state information from the non-volatile memory 14 (S21). That is, the brake ECU 1 is configured to store the vehicle state information in a memory thereof as long as the brake ECU 1 is shut down normally. Thus, if no vehicle state information is found in the non-volatile memory 14 when the shutdown determination part 21 reads the vehicle state information therefrom, the shutdown determination part 21 can determine that the brake ECU 1 has been previously shut down abnormally. Then, whether or not the cranking pre-notice information has been stored in the non-volatile memory 14 or the like is determined (S22). A case where the cranking pre-notice information is present means a case where cranking is about to be conducted, based on a driver's manual operation, that is, an operation to turn ON an ignition switch such as an operation of manipulating an engine start button.

On the other hand, if the cranking pre-notice information is not determined to have been stored in the non-volatile memory 14 or the like (if No in S22), the processing returns to S21. A case where the cranking pre-notice information has not been stored in the non-volatile memory 14 or the like (if No in S22) includes, for example, a case where an engine is intended to be restarted automatically from a state of no idling control.

Figure 6:
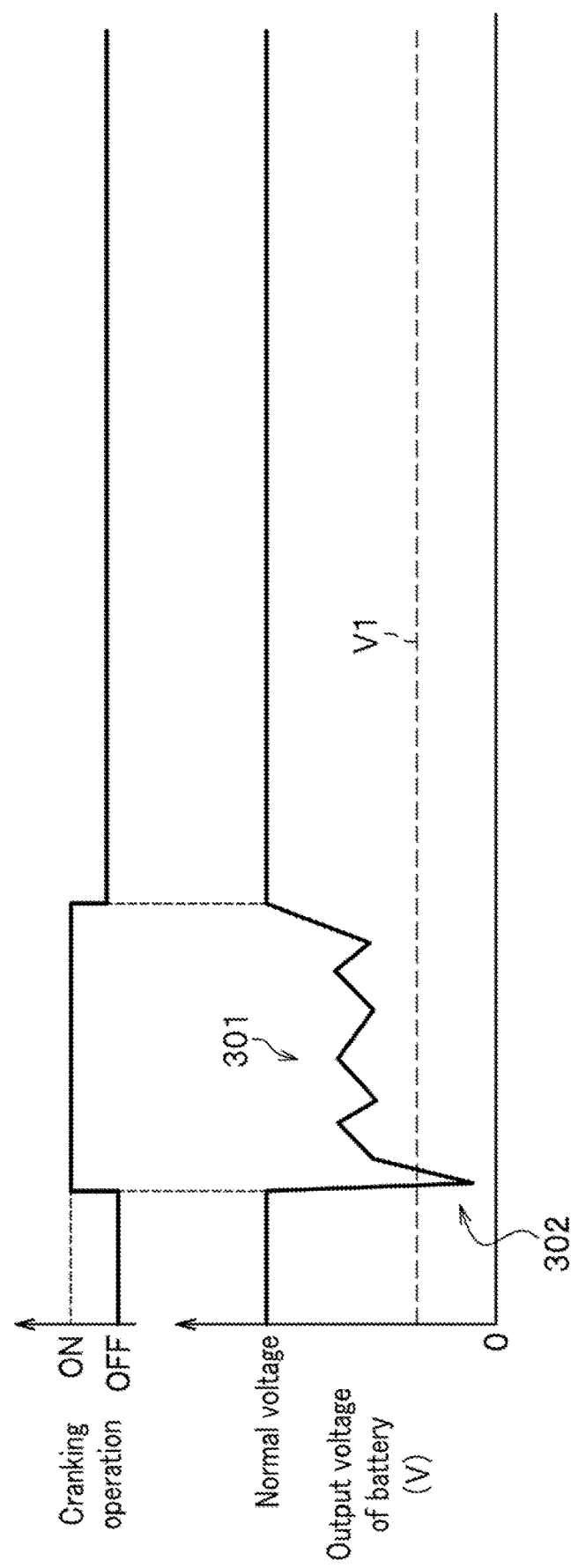
FIG. 6 is a graph illustrating a relationship between cranking and output voltage of a battery with a lapse of time according to the embodiment.

A case is herein described in which the brake ECU 1 has been previously shut down abnormally. FIG. 6 is a graph illustrating a relationship between cranking and output voltage of the battery 35 with a lapse of time. An upper portion of the graph shows a change in time of a cranking operation. A lower portion thereof shows a change in time of output voltage of the battery 35 with respect to the brake ECU 1 or the like. It is assumed herein that the battery 35 has already become degraded or a vehicle of interest is located in a cold area. When cranking is conducted under the above-described condition, because cranking requires high power, a voltage supplied to the brake ECU 1 hits a level significantly lower than that of a normal voltage value (designated by reference numeral 301) in some cases. As illustrated in FIG. 6, the voltage supplied from the battery 35 to the brake ECU 1 thus becomes equal to or lower than a threshold V1 at or under which the brake ECU 1 is reset (designated by reference numeral 302). Then, because the low voltage cannot keep a (normal) voltage value at or above which the brake ECU 1 works well, the brake ECU 1 is forced to shut down abruptly. Such a shut-down is deemed as abnormal and is done without storing the vehicle state information in the non-volatile memory 14.

Description is made referring back to FIG. 4. In the processing of FIG. 4, the brake ECU 1 is activated. In activating the brake ECU 1, a plurality of initial diagnoses have already been performed. Some examples of the initial diagnoses include: a diagnosis of whether or not the brake ECU 1 can perform a communication with other system via the CAN communication system 3; a diagnosis of whether or not the battery 35 is ready for supplying the brake ECU 1 with necessary power; and a diagnosis of how is a state of an actuator controlled by the brake ECU 1. A time required for each of the initial diagnoses approximately ranges from several hundred milliseconds to several seconds. Though only for a short period of time, the brake ECU 1 cannot provide control over the electric brake system 2 during the time period. Therefore, for example, when the vehicle has parked on a slope, there is a possibility that the vehicle slides down.

As described above, a plurality of initial diagnoses are conducted. If Yes in S22, the diagnosis skip control part 24 determines which initial diagnosis is to be skipped depending on a running condition of the vehicle (S23). The type or the number of the initial diagnoses to be determined to be skipped varies according to the running condition of the vehicle. The number may be only one, all, or any other (details of the running condition will be described hereinafter).

Based on a step performed in S23, the diagnosis part 23 either conducts an appropriate initial diagnosis/diagnoses with one or more initial diagnoses skipped, or conducts no initial diagnoses if all initial diagnoses are determined to be skipped (S24). This allows a time required for the initial diagnoses to be reduced or to be nil.

Figure 5:
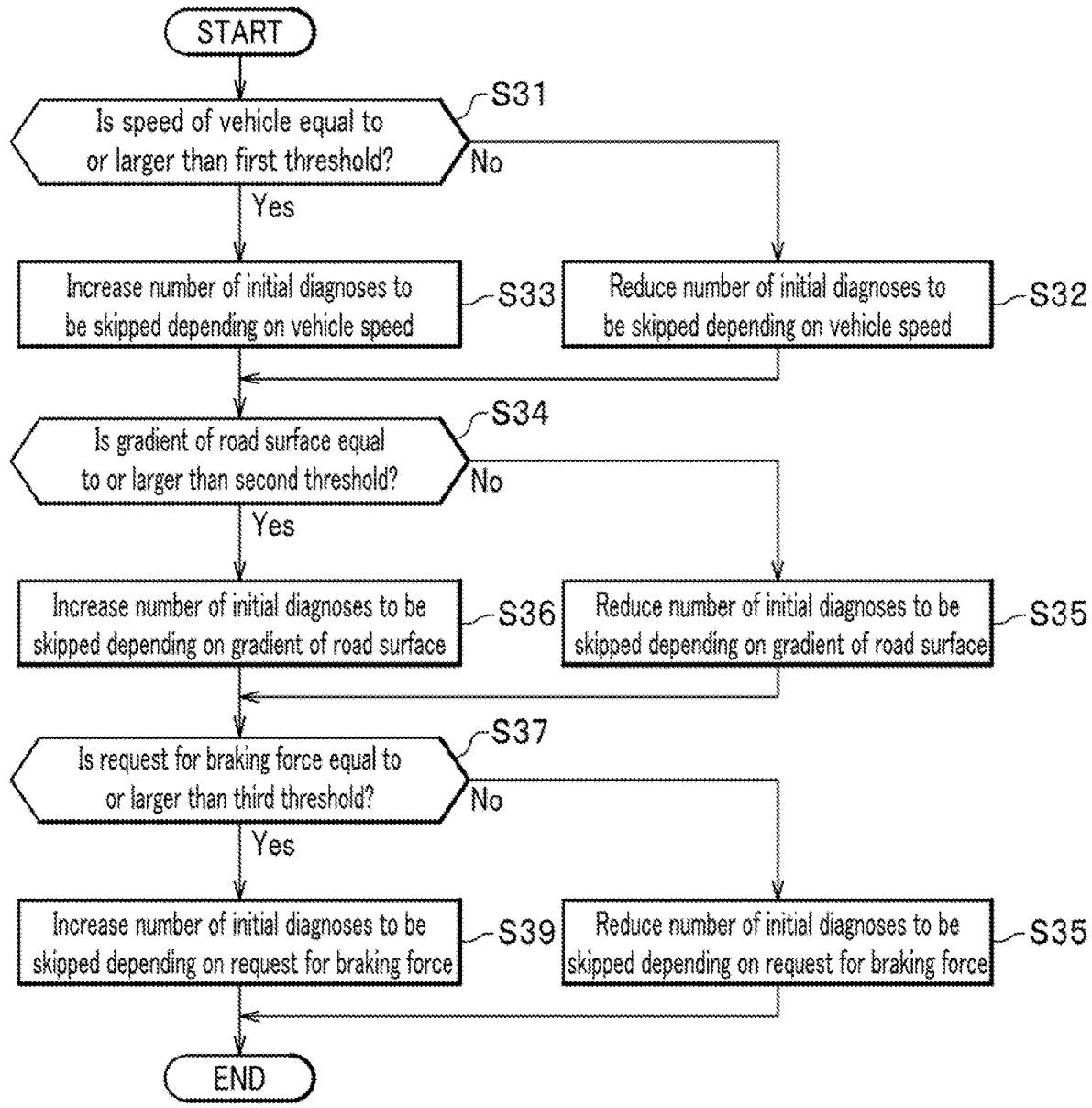
FIG. 5 is a flowchart illustrating a subroutine of S23 performed by the brake ECU according to the embodiment.

Next are described details of the step of S23. FIG. 5 is a flowchart illustrating a subroutine of S23. In S23, the diagnosis skip control part 24 determines whether or not any initial diagnoses is to be skipped, depending on the running condition of the vehicle. In this embodiment, description is made assuming that there are three examples of the "running condition of the vehicle", namely: a speed of the vehicle; a gradient of a road surface on which the vehicle is located; and a request for braking force (a brake fluid pressure) of the vehicle.

The diagnosis skip control part 24 determines whether or not a speed of the vehicle obtained from a result detected by the wheel speed sensor 34 is equal to or larger than a predetermined first threshold (S31). The first threshold assumes a case where a quick start-up of the electric brake system 2 is required, when, for example, the brake ECU 1 has been shut down while the vehicle is running at high speed for some reason. If the speed of the vehicle is equal to or higher than the first threshold (if Yes in S31), the diagnosis skip control part 24 increases the number of initial diagnoses to be skipped (S33), to thereby reduce a time taken to perform the initial diagnoses, which allows a quick start-up of the electric brake system 2. If the speed of the vehicle is lower than the first threshold (if No in S31), the diagnosis skip control part 24 reduces the number of the initial diagnoses to be skipped, because the vehicle speed is not relatively high, thus allowing for more time in performing the initial diagnoses (S32).

As described above, the higher the vehicle speed, the shorter the time required for a start-up of the electric brake system 2. Therefore, the higher the vehicle speed, the more quickly the braking force can be given.

The diagnosis skip control part 24 determines whether or not a gradient of a road surface on which the vehicle is located, which is obtained from a result detected by the G sensor 33, is equal to or larger than a predetermined second threshold (S34). If the gradient of the road surface is equal to or larger than the second threshold (if Yes in S34), the diagnosis skip control part 24 increases the number of initial diagnoses to be skipped, because the gradient is steep and there is a high possibility that the vehicle slides down (S36). That is, as much initial diagnoses as possible are skipped such that the electric brake system 2 quickly becomes available. If the gradient of the road surface is smaller than the second threshold, the diagnosis skip control part 24 reduces the number of the initial diagnoses to be skipped, because the gradient is mild and there is a low possibility that the vehicle slides down (S35). That is, more time for performing the initial diagnoses may be allowed.

As described above, the larger the gradient of the road surface, the shorter the time required for a start-up of the electric brake system 2. Therefore, the larger the gradient of the road surface, the more quickly the braking force can be given.

The diagnosis skip control part 24 also determines, for example, whether or not a request for the braking force detected by the brake pedal stroke sensor 32 is equal to or larger than a predetermined third threshold (S37). If the requested braking force is equal to or larger than the predetermined third threshold (if Yes in S37), the diagnosis skip control part 24 increases the number of initial diagnoses to be skipped (S39), because of the requested large braking force. That is, the diagnosis skip control part 24 determines: that the braking force needs to be promptly exerted; and that as much initial diagnoses as possible be skipped such that the electric brake system 2 quickly becomes available. In the meantime, if the requested braking force is smaller than the predetermined third threshold (if No in S37), the diagnosis skip control part 24 determines which of the initial diagnoses is to be skipped depending on the requested small braking force (S38). That is, the diagnosis skip control part 24 determines: that the braking force does not need to be promptly exerted; and that not so much initial diagnoses are to be skipped; and more time can be taken to perform the initial diagnoses.

Note that the request for the braking force is not limited to a request from a driver who presses down a brake pedal. How much braking force is requested may be determined in S37 in such cases when the vehicle is running following a preceding vehicle and when an automatic braking is applied for reducing collision damage.

As described above, in the processing of FIG. 5, the initial diagnoses to be skipped are determined in each step of: S33 or S32; S36 or S35; and S39 or S38, total of which are skipped in S24.

Figure 7:
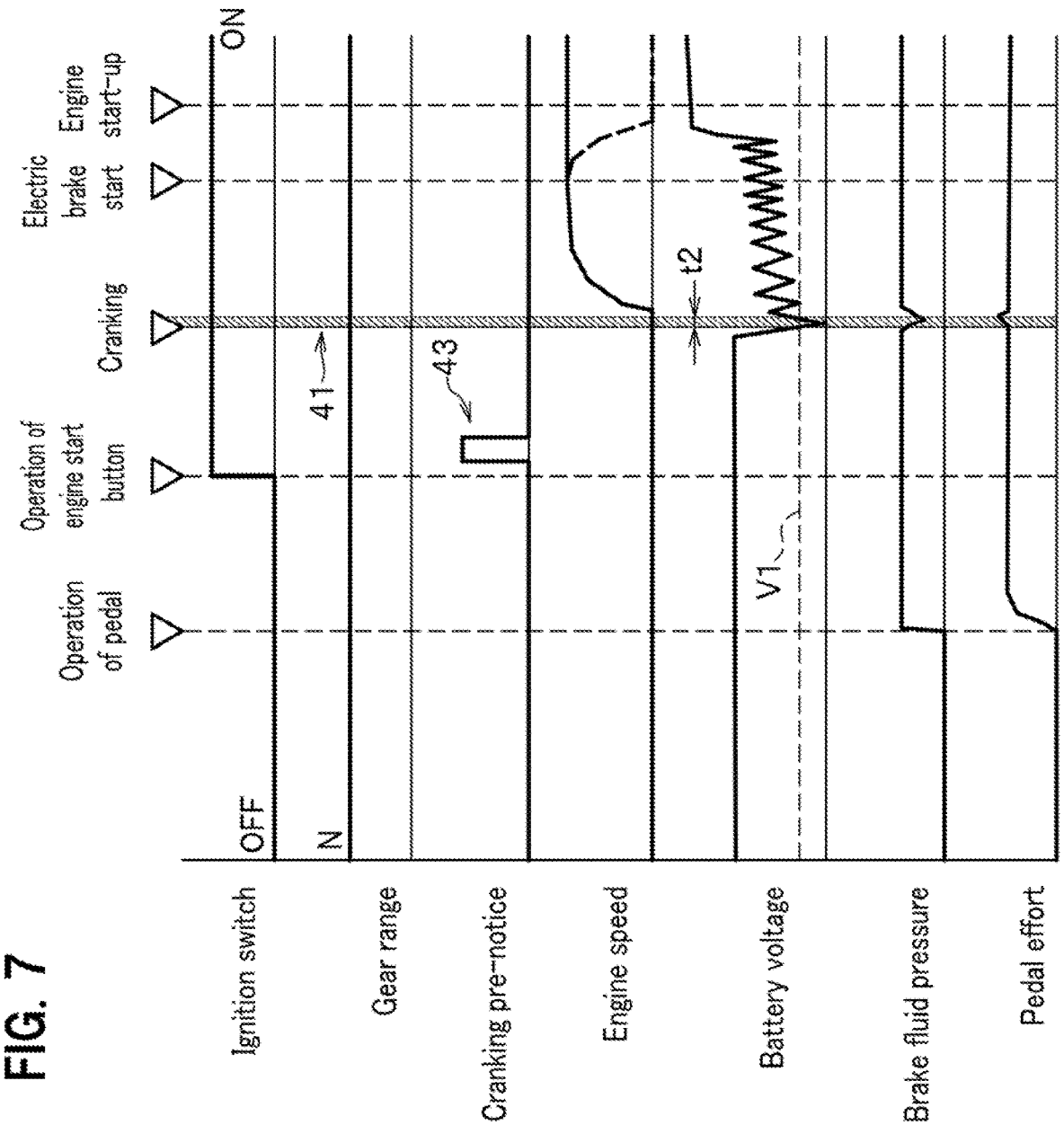
FIG. 7 is a timing chart for explaining a processing performed by the brake ECU according to the embodiment.
Figure 8:
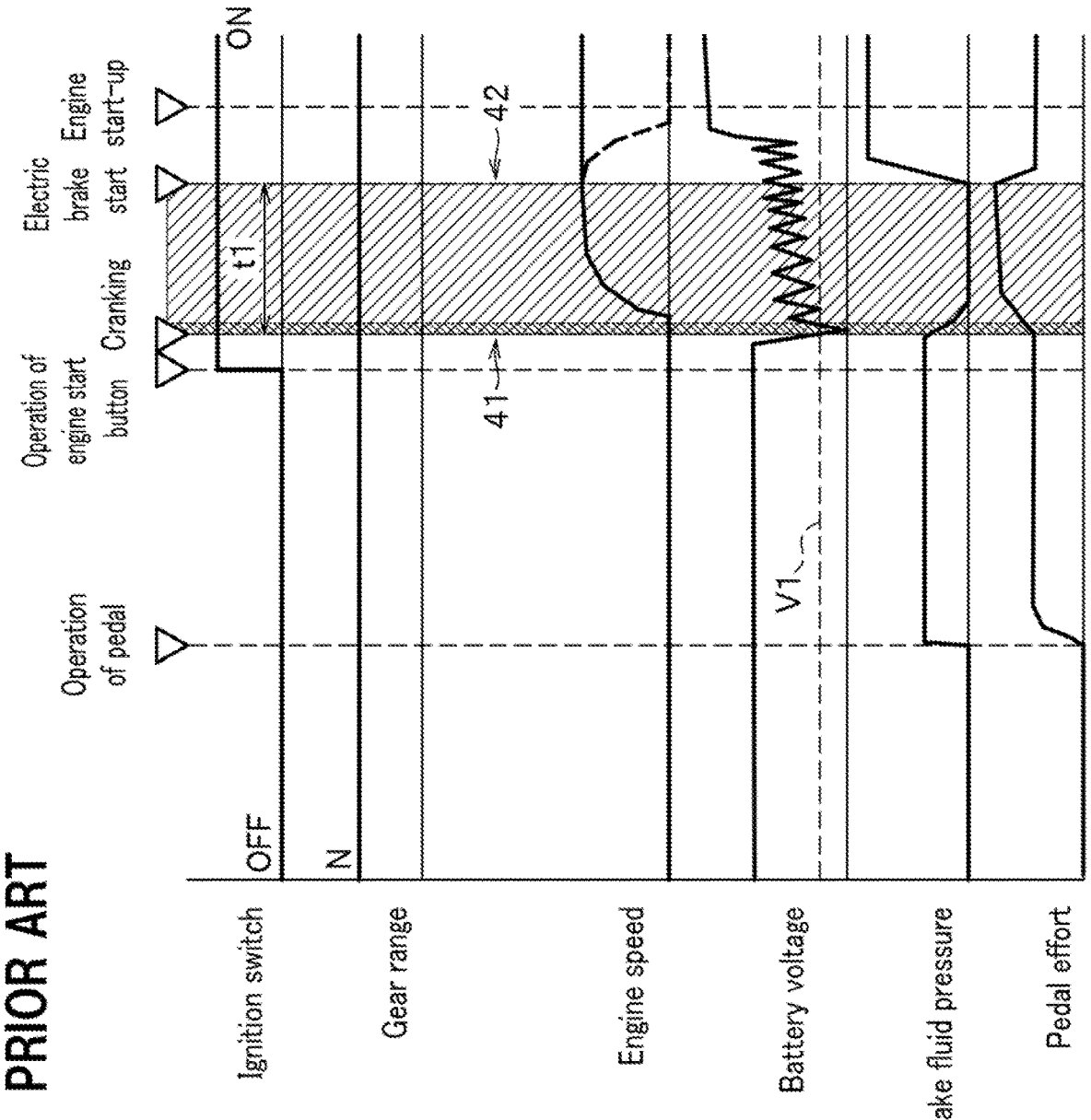
FIG. 8 is a timing chart in a conventional example as a comparative example of FIG. 7.

Next is described how to control the present embodiment with reference to related timing charts. FIG. 7 is a timing chart for explaining contents of the control in this embodiment. FIG. 8 is a timing chart in a conventional example as a comparative example of FIG. 7. In FIG. 7 and FIG. 8, the same terms used have the same meanings.

The timing chart of FIG. 8 as the comparative example is described first. In the timing chart, the abscissa represents statuses of various parts of the vehicle; and the ordinate, changes in the statuses over time. In the abscissa, "ignition switch" shows whether or not an ignition switch of the vehicle is ON or OFF. "Gear range" shows a gear range of the vehicle and is, in this case, always in neutral (N). This applies equally to an example illustrated in FIG. 7. "Engine speed" shows the number of revolutions of an engine (an engine speed) of the vehicle. "Battery voltage" shows changes in a level of voltage supplied from the battery 35 to the brake ECU 1. "Brake fluid pressure" shows a fluid pressure generated when the electric brake system 2 operates. And, "pedal effort" shows a magnitude of a force applied when a driver presses a brake pedal.

Next is described the ordinate. "Operation of pedal" shows a timing at which the driver presses the brake pedal for starting the vehicle. "Operation of engine start button" shows a timing at which the driver manually operates an engine start button for starting up the engine. "Cranking" shows a timing at which a cranking is started for starting up the engine. "Electric brake start" shows a timing at which the electric brake system 2 is started after the brake ECU 1 enters a state capable of controlling the electric brake system 2. And, "engine start-up" is a timing at which the engine is started up.

Note that the brake ECU 1 is already started before "operation of pedal" is performed, and the electric brake system 2 is ready for being activated. The driver presses the brake pedal at the timing of "operation of pedal". In response to this, the electric brake system 2 generates fluid pressure, which increases "brake fluid pressure". This applies a brake on the vehicle, and, even when the gear is in neutral, the vehicle would not slide down. The driver manually operates the engine start button at the timing of "operation of engine start button" for initiating the engine, while keeping the brake pedal pressed, that is, while keeping the brake applied. At this timing, "ignition switch" is switched from OFF to ON.

"Cranking" is then started for starting up the engine. Because cranking requires high power, if the battery 35 has already become degraded or the vehicle is located in a cold area, "battery power" supplied to the brake ECU 1 becomes lower than that in a normal condition. The reduction in power is significant especially in an initial stage of a cranking operation. Thus, immediately after starting the cranking, "battery voltage" becomes equal to or lower than the threshold V1 at or under which the electric actuation is reset as described above. The brake ECU 1 is thereby forced to shut down abruptly. A time period during which "battery voltage" decreases to equal to or smaller than the threshold V1 is generally very short (designated by reference numeral 41). After that, "battery voltage" increases to equal to or larger than the threshold V1, and the brake ECU 1 is restarted. In an initial stage of the restart, it is necessary to perform an initial diagnosis, which takes a time period designated by reference numeral 42. Regarding "battery voltage", it takes, for example, several hundred milliseconds to several seconds to complete the initial diagnoses after the battery voltage decreases equal to or lower than the threshold V1 (a time period t1 which is a total of a time period designated by reference numeral 41 and a time period designated by reference numeral 42). Because the brake ECU 1 cannot provide control on the electric brake system 2 during the time period, a mechanism for boosting a brake fluid pressure does not work and cannot give a sufficient braking force to the vehicle. If the vehicle is located on a slope, the vehicle slides down relatively largely. The driver thus feels something uncomfortable and presses down the brake pedal securely. This makes "pedal effort" larger.

After the initial diagnosis is completed and the time t1 lapses, "boosting function by the electric brake is started" begins. In response to this, the brake ECU 1 starts providing control on the electric brake system 2. At this time, "pedal effort" has become large. An abrupt large "brake fluid pressure" is thus generated and a slide down of the vehicle is stopped. After that, the engine is started by cranking at the timing of "engine start-up". Note that, if cranking fails, the engine speed decreases to zero as indicated by a dashed line at "engine speed".

Next is described FIG. 7. In FIG. 7, description which is otherwise duplicated with that of FIG. 8 is omitted. FIG. 7 is different from FIG. 8 in that the abscissa of a timing chart thereof has "cranking pre-notice" which shows a timing at which the cranking pre-notice information described above is stored. As designated by reference numeral 43, a timing at which the cranking pre-notice information is stored in response to "cranking pre-notice" is immediately after the timing of "operation of engine start button" when the driver manually operates the engine start button.

Then, a cranking is started at a timing of "cranking". Similarly to the example of FIG. 8, "battery power" supplied to the brake ECU 1 becomes lower than that in a normal condition. This occurs, similarly to the example of FIG. 8, when the battery 35 has already become degraded or a vehicle of interest is located in a cold area. Then, similarly to the example of FIG. 8, immediately after a start of the cranking, "battery voltage" becomes equal to or lower than the threshold V1. The brake ECU 1 is thereby forced to shut down abruptly. Such a shut-down is deemed as abnormal and the vehicle state information described above is not stored.

In the example of FIG. 7, the cranking pre-notice information is stored, while the vehicle state information is not stored. This satisfies the above-described condition for Yes in S23 of FIG. 4, and the above-described steps in S23 and S24 are thus performed. This means that part or all of the initial diagnoses are skipped. In the example of FIG. 7, all of the initial diagnoses are skipped and there is no time required for the initial diagnoses. A time period during which the electric brake system 2 does not work is therefore only a very short time t2 designated by reference numeral 41 during which "battery voltage" becomes equal to or smaller than the threshold V1. This results in a slight decrease of "brake fluid pressure" only during the time t2. Even when the vehicle is on a slope, the vehicle would slide down very little. The driver feels little discomfort, and "pedal effort" is therefore increased little when the cranking is conducted.

In the brake ECU 1 described above according to this embodiment, the diagnosis skip control part 24 can reduce the initial diagnoses after the brake ECU 1 is abnormally shut down (reset). Thus, for example, it is possible to supply power to a mechanism for boosting the electric brake system 2 at an early stage, to thereby prevent a vehicle from sliding down even when an abnormal shut-down occurs.

A vehicle which has a no idling function includes a detector that detects a state of the battery 35. If the battery 35 is detected to become deteriorated, the vehicle is designed not to perform a no idling operation. This means that, when a no idling operation is performed, the battery 35 is not deteriorated, and voltage supplied from the battery 35 is guaranteed. Thus, the brake ECU 1 will not be restarted, which excludes a need for skipping the initial diagnoses. This is advantageous because, when a cranking is automatically conducted at a time of restart from a no idling operation or the like, no initial diagnosis is skipped, to thereby allow reliable initial diagnoses to be performed, while in the meantime, an unnecessary initial diagnosis can be omitted as described above. Further, in the vehicle which has the no idling function, skip of an unnecessary initial diagnosis is prevented, and storage of the cranking pre-notice information in the non-volatile memory 14 or the like is also omitted. This can prevent the non-volatile memory 14 from being deteriorated.

In this embodiment, whether or not the brake ECU 1 has been shut down normally can be determined simply by determining whether or not information on a state of a vehicle has been stored at a time of a start-up of the brake ECU 1. This means that just a simple control makes it possible to determine whether the brake ECU 1 has been shut down normally or abnormally. This can contribute to simplification of controlling and reduction in manufacturing cost.

In this embodiment, the cranking pre-notice information is stored, when the engine is manually started up (when an engine start button is pressed down or an ignition switch is turned ON). Just a simple control in which it is determined whether or not the cranking pre-notice information has been read at a time of start-up of the brake ECU 1 makes it possible to determine whether or not the engine is started up by a manual operation. This can contribute to simplification of controlling and reduction in manufacturing cost.

In this embodiment, the cranking pre-notice information is written only when the brake pedal is being depressed (FIG. 3). Thus, the cranking pre-notice information in which a driver's intention of starting up the vehicle is reflected more accurately can be written, thus allowing an unnecessary write to the non-volatile memory 14 or the like to be prevented. This can improve durability of the non-volatile memory 14 or the like. Alternatively, a low-cost memory having low durability can be used, to thereby reduce manufacturing cost.

In this embodiment, which of the initial diagnoses is to be skipped is determined depending on the running condition of the vehicle (S23). Thus, setting of how much time required for the initial diagnoses to be reduced can be performed.

When, for example, the brake ECU 1 is shut down for some reason while a vehicle is running at high speed, control is provided as follows. A time taken for the initial diagnoses is reduced, giving priority to boost a pressure of the electric brake system 2, to thereby provide control such that the electric brake system 2 can increase braking force promptly (S31 to S33).

When, for example, a vehicle is running or stopped on a steep upward slope and the brake ECU 1 has been shut down, control is provided as follows. The number of the initial diagnoses to be skipped is increased, and a time required for the initial diagnoses is reduced, giving priority to boost a pressure of the electric brake system 2, to thereby provide control such that the electric brake system 2 can increase braking force promptly. Or, when a vehicle is running or stopped on a relatively mild upward slope and the brake ECU 1 has been shut down, control is provided as follows. The number of the initial diagnoses to be skipped is reduced compared to that of the steep upward slope, to thereby provide control such that the high-priority initial diagnoses are performed (S34 to S36), while a time required for the initial diagnoses in total is made shorter.

Further, when a larger braking force is requested, the number of the initial diagnoses to be conducted is reduced, a time required for the initial diagnoses is made shorter, giving priority to boost a pressure of the electric brake system 2, to thereby generate a braking force by the electric brake system 2 promptly (S37 to S39).

In this case, one or more initial diagnoses to be skipped may be determined not according to a magnitude of a requested braking force but according to a type of the requested braking force. For example, when a braking force is requested by a driver's depression of a brake pedal or by an automatic braking system, control may be provided such that the number of the initial diagnoses to be skipped is increased. Further, determination in S23 may be made not only according to the running condition of the vehicle described in this embodiment but also according to any other running condition.

Regarding a hybrid automobile or the like having a plurality of on-board batteries, even when voltage of one of the batteries become decreased, another can compensate for the one, though there are still problems that a plurality of batteries of the hybrid car increase manufacturing cost, and a control circuit thereof becomes complicated. The present invention is effectively applicable to such a hybrid automobile or the like having a plurality of on-board batteries.

DESCRIPTION OF REFERENCE NUMERALS 1 brake ECU (vehicle controller, vehicle control device)
2 electric brake system
21 shutdown determination part
22 cranking determination part
23 diagnosis part
24 diagnosis skip control part
25 vehicle state storage part
26 cranking pre-notice information storage part
27 brake pedal depression detection part
28 running condition acquisition part

The invention claimed is:

1. A vehicle control device which provides control on an electric brake system of a vehicle, comprising a processor configured to:
   determine whether the vehicle control device itself has been previously shut down normally or abnormally, wherein a previous shutdown has been abnormal when at a start-up of the vehicle no vehicle state information on the previous shutdown is determined to have been stored, the abnormal previous shut down requiring a reset of the vehicle control device when the vehicle is started up;
   determine whether or not an instruction to perform a cranking at the start-up of the vehicle is based on a manual operation of a driver of the vehicle;
   perform a plurality of initial diagnoses of the vehicle control device at the start-up of the vehicle; and
   provide control such that the processor skips at least one of the initial diagnoses so as to reduce a time required for the initial diagnoses or skips all of the initial diagnoses, when the processor determines that the vehicle control device has been previously shut down abnormally, and at the same time, when the processor determines that the cranking has been conducted based on the driver's manual operation.

2. The vehicle control device according to claim 1, wherein the processor is further configured to:
make vehicle state information stored, the vehicle state information showing, when the vehicle control device has been shut down normally, a state of the vehicle at the time of the shutdown.

3. The vehicle control device according to claim 1, wherein the processor is further configured to;
store cranking pre-notice information showing, when an instruction to start up an engine of the vehicle has been given by a driver's manual operation and a cranking is thereby about to be performed, that the cranking to be performed is based on the driver's manual operation; and
determine that, when the cranking pre-notice information has been stored at the start-up of the vehicle, the cranking is about to be conducted based on the driver's manual operation.

4. The vehicle control device according to claim 3, wherein the processor is further configured to:
detect a depression of a brake pedal of the vehicle; and
make the cranking pre-notice information stored in a memory, when the driver has performed a manual operation for instructing to conduct a cranking while the processor is detecting the depression of the brake pedal.

5. The vehicle control device according to claim 1, wherein the processor is further configured to:
acquire information on a running condition of the vehicle; and
determine which of a plurality of the initial diagnoses is to be skipped, depending on the acquired running condition of the vehicle.

6. The vehicle control device according to claim 5, wherein, when the processor acquires information showing that the vehicle is running at a speed equal to or higher than a prescribed first threshold, the processor is configured to skip one or more of the initial diagnoses such that the initial diagnoses with the skip requires a time shorter than those without the skip.

7. The vehicle control device according to claim 5, wherein the processor is configured to determine which of a plurality of the initial diagnoses is to be skipped, depending on information on a gradient of a road surface on which the vehicle is located.

8. The vehicle control device according to claim 7, wherein, when the processor determines that the gradient of the road surface is equal to or larger than a prescribed second threshold, depending on the information on the road surface gradient, the processor is configured to skip one or more of the initial diagnoses such that the initial diagnoses with the skip requires a time shorter than those without the skip.

9. The vehicle control device according to claim 5, wherein the processor is configured to determine which of a plurality of the initial diagnoses is to be skipped, depending on information on a request of a braking force of the vehicle.

10. The vehicle control device according to claim 9, wherein, when the braking force in the braking force request information is equal to or larger than a prescribed third threshold, the processor is configured to skip one or more of the initial diagnoses such that the initial diagnoses with the skip requires a time shorter than those without the skip.

11. The vehicle control device according to claim 2, wherein the processor is further configured to:
make cranking pre-notice information stored, the cranking pre-notice information showing, when an instruction to start up an engine of the vehicle has been given by a driver's manual operation and a cranking is thereby about to be performed, that the cranking to be performed is based on the driver's manual operation; and
determine that, when the cranking pre-notice information has been stored at the start-up of the vehicle, the cranking is about to be conducted based on the driver's manual operation.

12. The vehicle control device according to claim 2, wherein the processor is further configured to:
acquire information on a running condition of the vehicle; and
determine which of a plurality of the initial diagnoses is to be skipped, depending on the acquired running condition of the vehicle.

13. The vehicle control device according to claim 3, wherein the processor is further configured to:
acquire information on a running condition of the vehicle; and
determine which of a plurality of the initial diagnoses is to be skipped, depending on the acquired running condition of the vehicle.

14. The vehicle control device according to claim 4, wherein the processor is further configured to:
acquire information on a running condition of the vehicle; and
determine which of a plurality of the initial diagnoses is to be skipped, depending on the acquired running condition of the vehicle.

15. The vehicle control device according to claim 6, wherein the processor is configured to determine which of a plurality of the initial diagnoses is to be skipped, depending on information on a gradient of a road surface on which the vehicle is located.

16. The vehicle control device according to claim 6, wherein the processor is configured to determine which of a plurality of the initial diagnoses is to be skipped, depending on information on a request of a braking force of the vehicle.

17. The vehicle control device according to claim 7, wherein the processor is configured to determine which of a plurality of the initial diagnoses is to be skipped, depending on information on a request of a braking force of the vehicle.

18. The vehicle control device according to claim 8, wherein the processor is configured to determine which of a plurality of the initial diagnoses is to be skipped, depending on information on a request of a braking force of the vehicle.

* * * * *